United States Patent [19]

Huisman

[11] 4,153,754

[45] May 8, 1979

[54] MAGNETIC RECORDING MEDIUM IN WHICH AN N-ACYLSARCOSINE DERIVATIVE IS USED AS A DISPERSING AGENT

[75] Inventor: Hendrikus Huisman, Oosterhout, Netherlands

[73] Assignee: U.S. Philips Corporation, New York, N.Y.

[21] Appl. No.: 894,750

[22] Filed: Apr. 10, 1978

[30] Foreign Application Priority Data

Apr. 18, 1977 [NL] Netherlands ................ 7704183

[51] Int. Cl.$^2$ .............................................. H01F 1/02
[52] U.S. Cl. ................ 428/539; 252/62.51; 252/62.52; 252/62.53; 252/62.54; 428/425; 428/426; 428/457; 428/480; 428/475; 428/522; 428/524; 428/900; 428/537
[58] Field of Search ............ 428/900, 539, 537, 480, 428/474, 425, 476, 457, 522, 524; 252/62.53, 62.54, 62.51, 62.52; 427/48, 127, 128

[56] References Cited

U.S. PATENT DOCUMENTS

| | | | |
|---|---|---|---|
| 3,647,539 | 3/1972 | Weber | 131/2 |
| 3,687,725 | 8/1972 | Hartmann | 428/900 |
| 3,804,810 | 4/1974 | Fryd | 428/900 |
| 4,020,236 | 4/1977 | Aonuma | 428/900 |
| 4,063,000 | 2/1977 | Aonuma | 428/900 |

*Primary Examiner*—Ellis P. Robinson
*Attorney, Agent, or Firm*—Norman N. Spain

[57] ABSTRACT

The invention relates to a magnetic recording medium, for example a magnetic tape, which comprises a carrier and a magnetizable coating provided thereon which comprises a binder as well as a magnetic pigment dispersed in the binder by means of a dispersing agent. As a dispersing agent is used an N-acylsarcosine derivative. Herewith an optimum dispersion of the pigment in the binder is obtained in a short dispersion time. An excess of dispersing agent serves as a lubricant upon migration. The acyl group comprises preferably an aliphatic or olefinic hydrocarbon chain having 12–22 carbon atoms. Furthermore are to be preferred salts of N-acrylsarcosine, in particular metal salts, alkali metal salts, alkaline earth metal salts and amine salts.

7 Claims, No Drawings

MAGNETIC RECORDING MEDIUM IN WHICH AN N-ACYLSARCOSINE DERIVATIVE IS USED AS A DISPERSING AGENT

The invention relates to a magnetic recording medium comprising a non-magnetic carrier as well as a magnetizable coating which is provided on the carrier and comprises a binder, as well as a magnetic pigment finely divided therein by means of a dispersing agent.

The carrier is usually manufactured from a synthetic resin, for example polyester or polyvinyl chloride, but may alternatively be paper, glass or metal. The carrier may have the shape of a tape, plate, disc and the like.

In order to obtain a good recording density and hence a faithful reproduction or recording of signals, it is of great importance for the magnetic pigment, that is the magnetizable particles, to be optimally dispersed in the binder.

The dispersing agents usually used for this purpose may be distinguished into two groups, namely the low-molecular and high-molecular dispersing agents. The low-molecular agents, for example the natural product lecithin, have the disadvantage that an excess is necessary to fully cover the particles to be dispersed. Extra materials have to be added so as to mitigate migration of said excess. Furthermore it is difficult to find out whether the extra materials produce the desired immobilizing effect. The said addition of extra materials, for example a drying oil, is described inter alia in the U.S. Pat. No. 3,471,415.

The high-molecular dispersing agents, as described, for example, in Netherlands Patent Application No. 65.11015 laid open to public inspection have the disadvantage that, due to their poor wetting properties, agglomerates of particles are also covered with dispersing agent. It is not readily possible or is possible only by the use of much energy, to disintrigate said aggolomerates to individual particles.

Applicants have now developed a magnetic recording medium of the kind mentioned in the preamble which does not exhibit the above-mentioned disadvantages and which is characterized in that the dispersing agent is an N-acylsarcosine derivative.

The degree of distribution of the magnetic pigment in the binder is optimum, so that an improved electro-magnetic quality of the recording medium according to the invention is obtained and faithful recording or reproduction of signals is possible. It is furthermore been found that the use of an excess of the dispersing agent so as to obtain a full covering of the pigment with dispersing agent as rapidly as possible is not disadvantageous. On the contrary, an excess of dispersing agent and the associated migration of the dispersing agent is just favourable because the excess of dispersing agent serves as a lubricant and improves the transport properties and reduces the detrition of the recording medium, for example a magnetic tape. The addition of an extra lubricant is of course possible but is not strictly necessary.

In the recording medium according to the invention are preferably used N-acylsarcosine derivatives which correspond to the formula

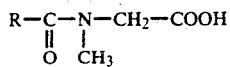  (formula 1)

of salts thereof, in which formula R is an aliphatic or olefinic hydrocarbon chain having 12–22 carbon atoms.

Examples of a very readily useful aliphatic or olefinic hydrocarbon groups are a lauryl, cocoyl, olyl, linoleyl or stearyl group.

In a favourable embodiment of the recording medium according to the invention the salts of the carboxylic acid indicated by formula 1 are used as a dispersing agent and in particular metal salts, alkali metal salts, alkaline earth metal salts and amine salts. Examples hereof are Na-, Li-, Ca-, Zn-, Cu-, Pb-salts, salts of aliphatic or olefinic amines having a longer hydrocarbon chain, for example linoleyl amine, oleyl amine, lauryl amine, palmityl amine, stearyl amine, amyl amine, cocoafat amine, salts of heterocylic amines, for example morpholine, salts of amines which per molecule contain several amino groups, such as hexamethylene tetramine, salts of aromatic amines, for example alkyl-substituted aniline, as well as salts of tertiary amines, such as trialkanol amines, for example triethanol amine and trialkyl amines, such as triethyl amine.

Particularly suitable salts are in particular the sodium salt and amine salts derived from an aliphatic or olefinic amine having 12–22 carbon atoms and of triethanol amine.

In a further favourable embodiment of the recording medium according to the invention an excess of dispersing agent is used. As stated hereinbefore, this results in the advantage that the dispersion time is shorter and furthermore the excess serves as a lubricant as a result of migration.

A suitable quantity of dispersing agent is 1–10% by weight calculated on the quantity of the magnetic pigment, and preferably is 2–5% by weight.

The binders to be used in the recording medium according to the invention are of the conventional type. Examples of suitable binders are, for example, polyvinyl chloride, polyvinyl acetate, polyacrylates, polyester, polyester amides, polyurethanes and copolymers of at least two monomers selected from the group consisting of vinyl chloride, vinyl acetate, acrylonitrile, vinyl alcohol, vinyl butyral and vinylidene chloride. Readily useful binders are in particular polyurethane and partially hydrolized copolymers of vinylchloride and vinyl acetate.

The magnetizable particules present in the binder are also of the conventional type. A magnetizable particles may be used, for example: Fe-power, $Fe_2O_3$ particles and $CrO_2$ particles.

The particles are generally acicular and have a length of $0.1$–$1\mu$ and a thickness of $0.01$–$0.2\mu$.

Other ancillary substances, for example a lubricant, may be dissolved or dispersed in the binder in addition to the magnetizable particles and the dispersing agent. Useful lubricants are, for example, oleic acid, mineral oils, fatty acid amides or mixtures thereof.

The preparation of the recording medium according to the invention may be carried out in the usual manner, for example, by thoroughly mixing, by means of a ball mill the magnetizable particles, the dispersing agent and a part of the binder in a solvent for the binder. The remainder of the binder dissolved in a suitable solvent and the lubricant are then added and the whole is further ground in the ball mill for a few hours. As solvents for the binder may be used organic liquids, such as esters, for example ethyl acetate, ethers, for example tetrahydrofuran, ketones, for example methylethylketone, methylisobutyl ketone and cyclohexanone, hydrocarbons, for example toluene and chlorinated hydrocarbons, for example, 1,2-dichloroethane. It is also possible to carry out the above process in one step in which all the ingredients are simultaneously supplied to the ball mill. The quantity of lubricant is as a rule 0.1–10% by weight calculated on the quantity of binder. The quantity of magnetizable particles (pigment) is approximately 60–85% by weight calculated on the overall amount of the magnetizable coating.

After thoroughly grinding the dispersion in the ball mill, the larger magnetizable particles possible still present are sieved out and the resulting magnetizable coating is provided on the carrier in a uniform layer. As already noted hereinbefore, the carrier may be in the form of a tape, disc or plate and the like and, dependent on the material from which the carrier is manufactured, may be provided, if desired, with a suitable adhesive layer for the magnetizable coating to be provided on the carrier. In addition to the adhesive layer, other layers, such as an antistatic layer, may be provided. The whole is then dried, the solvent evaporating, and a recording layer having a thickness of 2 to 10μ remaining on the carrier.

In order to promote the resistance to detrition, said layer may be hardened, if desired, and moreover be subjected to a calendering process in which the surface of the layer becomes smoother.

The invention will now be described in greater detail with reference to the ensuing specific examples.

EXAMPLES:

1. Preparation of magnetic recording medium with iron oxide pigment

The following ingredients are provided in a glass pearl mill comprising 600 glass pearls having a diameter of 1 mm.
- 100 parts by weight of $\gamma$-$Fe_2O_3$ particles
- 2.5 parts by weight of the Na-salt of laurylsarcosine
- 108 parts by weight of an 18.5% solution of the terpolymer vinyl chloride-vinyl acetate- vinyl alcohol in a mixture 1:1:1 of methylethyl ketone, methylisobutyl ketone and toluene
- 3 parts by weight of polyester softener (tradename Paraplex of Rohm and Haes)
- 6.4 parts by weight of epoxylated soya bean oil
- 113 parts by weight of a mixture 1:1:1 of methylethyl ketone, methylisobutyl ketone and toluene.

The introduced mixture of ingredients is ground at high speed of rotation of the pearl mill for 1.5 hours. The resulting magnetizable coating lacquer is then passed through a filter having a mesh width of 5μ and is provided on a polyester foil having a thickness of 12μ. After drying and calendering a recording medium is obtained in which the carrier (polyester foil) is provided with a magnetizable coating having a layer thickness of approximately 5 microns.

In the same manner a series of magnetic recording media (magnetic tape) were manufactured which mutually deviate in the choice of the dispersing agent used. In some tapes also 5 parts by weight of electrically conductive soot have been added extra so as to reduce the electrical resistance of the surface of the tape.

The usual electromagnetic standard measurements were carried out with each of the manufactured tapes. The results of said measurements are recorded in the following table in column 3. The measurements comprise a determination of a maximum output level at 10 KHz and 333 Hz; relative tape sensitivity at 333 Hz and 12.5 KHz; Bias noise. The result of each measurement is compared with that of a DIN-standard reference tape, the difference being expressed in dB's. The sum of the dB differences of all tests is recorded in column 3 under the heading ER (electrico-acoustical response). Said ER-value represents a complete picture of the electro-acoustical properties of the tape. A higher ER-value means a higher (better) level of electro-acoustical properties.

In column 2 is recorded the composition of the magnetic tape by stating the dispersing agent used as well as the possible added quantity of electrically conductive soot.

Table I of electro-acoustical properties

| Tape ref. no. | Dispersing agent | ER-value |
|---|---|---|
| 1 | Na-salt of lauryl sarcosine | +1.5 |
| 2 | lecithin | −3.1 |
| 3 | lauryl sarcosine as well as 5 parts by weight of soot | +0.1 |
| 4 | salt of oleyl sarcosine and cocoafat amine as well as 5 parts by weight of soot | +1.0 |
| 5 | lecithin as well as 5 parts by weight of soot | −4.0 |

2. Preparation of magnetic recording medium with iron powder pigment

The following ingredients are introduced in a so-called "High Speed dissolver", which is a mixer having a stirrer formed by a rotatable circular plate which is provided at the edge with projecting lugs alternately above and below the plane of the plate.
- 38 parts by weight of a 17% solution of a polyester urethane resin obtained from adipine acid, 1,4-butanediol and 4,4-diisocyanodiphenyl methane (tradename "Estane"), in tetrahydrofuran,
- 5.5 parts by weight of 30% solution of phenoxy resin (type PHKJ of Union Carbide) in tetrahydrofuran,
- 1.8 parts by weight of silane (type A 143 of Union Carbide) and
- 300 parts by weight of tetrahydrofuran.

The whole is stirred for 2 hours, the following ingredients being gradually added to the mixture:
- 175 parts by weight of Fe-powder
- 4 parts by weight of $Al_2O_3$
- 6.5 parts by weight of electrically conductive soot
- 7 parts by weight of Na-salt of lauryl sarcosine.

After having added all the ingredients in the course of the above 2 hours, stirring is continued for another 30 minutes after which the whole is mixed and ground in a pearl mill with glass pearls having a diameter of 1 mm.

Added to the rotating pearl mill are furthermore 150 parts by weight of the above-mentioned polyester urethane resin solution as well as 22 parts by weight of the above phenoxy resin solution and stirring was then continued for another 24 hours.

The resulting magnetizable coating lacquer is sieved through a filter having a mesh width of 3μ and provided on a polyester foil having a thickness of 12μ. After drying and calendering, the electroacoustical properties of the resulting magnetic tape are measured. Determined are, according to standard tests, the maximum output level at 333 Hz and 3% distortion; the relative tape sensitivity at 333 Hz and 12.5 KHz. The saturation at 12.5 KHz and the bias noise. The result of each measurement is compared with that of a $CrO_2$ reference tape having a bias adjustment of +3dB, the difference being expressed in dB's.

The sum of the dB differences of all the above tests was +14.5 dB.

An iron powder tape obtained in the same manner as stated above on the understanding that instead of the Na-salt of lauryl sarcosine, sodium oleate was used as a dispersing agent, was likewise tested electro-acoustically according to the above standard tests.

The resulting dB difference was +10.4 dB.

When using lecithin as a dispersing agent no stable magnetizable coating and hence no measurable tape was obtained.

What is claimed is:

1. A magnetic recording medium comprising a non-magnetic carrier and a magnetizable coating provided on said carrier, said magnetizable coating comprising a binder and magnetic pigments finely dispersed therein by means of a dispersing agent, said dispersing agent being an N-acylsarcosine derivative.

2. The magnetic recording medium of claim 1, wherein the dispersing agent corresponds to the formula $$R-\underset{\underset{O}{\parallel}}{C}-\underset{\underset{CH_3}{|}}{N}-CH_2-COOH$$

or salts thereof, wherein R is an aliphatic or olefinic hydrocarbon chain of 12–22 carbon atoms.

3. The magnetic recording medium of claim 2 wherein the dispersing agent is a alkali metal salt, an alkaline earth metal salt, a zinc salt, a copper salt, a lead salt or an amine salt of the N-acylsarcosine of claim 2.

4. The magnetic recording medium of claim 3 wherein the dispersing agent is a sodium salt of the N-acylsarcosine of claim 2.

5. The magnetic recording medium of claim 3 wherein the dispersing agent is an aliphatic or olefinic amine salt of the N-acylsarcosine wherein the amine moiety contains a hydrocarbon chain of 12–22 carbon atoms.

6. The magnetic recording medium of claim 3 wherein the dispersing agent is a triethanolamine salt of the N-acylsarcosine.

7. The magnetic recording medium of claim 1 wherein an excess of the dispersing agent is present.

* * * * *